No. 706,713.                    H. S. BACON.                    Patented Aug. 12, 1902.
LOCATION TRACER.
(Application filed May 2, 1901.)

(No Model.)

CITY HALL—CENTER FROM WHICH CARS START OR BY WHICH THEY PASS.

| STREET. | CAR LINE. | DIRECTION AND LOCATION. | MILES |
|---|---|---|---|
| Asylum, | Grant Square—Normal School, | 194 Summer Street, | ⅝ |
| Bath, | Newton Square—June Street, Tatnuck, | 300 Pleasant Street to 84 Abbott, | 1 |
| Cheever, | South Worcester—Webster, | 679 Southbridge to 44 Cambridge Street, to 8 Chelsea, | 1¼ |
| CEMETERIES. | | | |
| Hope, | Suburban, Leicester and Spencer Division, | Webster Street, near Railroad Crossing, | 2¼ |
| CHURCHES. | | | |
| Summer Street, | All Depot Cars, | At 205 Summer Street, | ½ |
| Union, | Lincoln Square Cars, | 402 Main, to Pearl, to Chestnut, | ¼ |
| HOTELS. | | | |
| City Hotel, | South Worcester—Webster, | Southbridge, corner Myrtle, | ¼ |
| PUBLIC BUILDINGS. | | | |
| Art Museum. | Boynton—Salisbury, | 45 Salisbury, | ¾ |

WITNESSES:
A. N. Pond.
Joseph A. Titus

INVENTOR:
H. S. Bacon,
By F. A. Cutter,
Atty.

UNITED STATES PATENT OFFICE.

HENRY S. BACON, OF WORCESTER, MASSACHUSETTS.

LOCATION-TRACER.

SPECIFICATION forming part of Letters Patent No. 706,713, dated August 12, 1902.

Application filed May 2, 1901. Serial No. 58,519. (No model.)

*To all whom it may concern:*

Be it known that I, HENRY S. BACON, a citizen of the United States, residing at Worcester, in the county of Worcester and State of Massachusetts, have invented a new and useful Location-Tracer, of which the following is a specification.

My invention relates to a location-tracer or guide system for towns, cities, counties, &c., in which a certain printed arrangement in book, tablet, or other suitable form of the names of roads, streets, avenues, alleys, places, terraces, lanes, or other thoroughfares, squares, parks, cemeteries, public and semipublic buildings, and other points of sufficient general interest; the names of car-lines to or plying through or nearest to the aforesaid roads, streets, &c., said car-lines serving in part as indicators of or guides to the route between two or more given points; the names and numbers of the thoroughfares from which the thoroughfares sought start and the names and numbers at which they end or names and numbers at which a building is located or of thoroughfares leading from the car-lines to said streets or points when not directly situated thereon, and the distances from a common center are combined with a printed key. These and such qualifications or modifications as naturally present themselves are comprised in the said invention; and the objects of my improvement are to furnish a quick and accurate guide for enabling one to readily ascertain the most direct or practical route from one point to another either by car, other conveyance, or on foot, together with the distances between points. This invention embodies explicit directions for reaching a given point, using the track or car line or lines as an indicator so far as possible. I attain these objects by the means illustrated in the accompanying drawing, in which a concrete example of my tracer is shown.

In practice what may be termed the "key" is the name of some central place that is universally known, as a railway-station or city hall, conveniently located relative to all lines of street-cars printed on or in the tracer, and with it may be printed such directions as may be deemed necessary for a full understanding of the use of the tracer. Then in separate columns, arranged in the order named from left to right, appear the names of the streets, churches, hotels, &c., under their respective headings and which for convenience I will here term "points;" the names of the car-lines leading from the central place or center to or nearest said points under their proper heading; the numbers and names of thoroughfares at which said points begin, begin and end, or are located and through or near which said car-lines pass, the same being under an appropriate heading as "Direction and location," and, lastly, the distances of said points from said center. These four vertical columns are arranged in the manner shown in the drawing, in which column 1 is the "point-column," 2 the car-line column, 3 the direction and location column, and 4 (miles) the distance-column. Above these columns appears the key 5, "City Hall."

Referring to the drawing, a stranger desiring to locate Asylum street sees at a glance that it may be reached from the City Hall by either of two car-lines, which latter pass through Summer street, and Asylum street starts from Summer street at No. 194, being five-eighths of a mile from the City Hall, as by column 4. If the stranger is on Asylum street and wishes to find the Summer-street church, he learns that said street cuts Summer street at No. 194 and that said church is located at No. 205 Summer street, within a few steps or easy walking distance. Another example: If he is on Bath street and desires to go to Cheever street, he finds it necessary to walk to Pleasant street, there take either a Newton-Square car or June-street car (or follow those tracks) for the City Hall, one mile distant, then transfer to either a South Worcester or Webster car and ride to No. 679 Southbridge street, where Cambridge street begins, from where he must walk on said last-mentioned street to No. 44, the junction of the same with Chelsea street, and proceed along Chelsea to No. 8, where the required Cheever street begins. The distance from the City Hall to Cheever street is one and one-half miles, which added to the previous one mile gives the total of two and one-half miles, the distance between Bath and Cheever streets, and so these examples might be multiplied; but it is believed enough has been given to fully explain my invention.

What I claim as my invention, and desire to secure by Letters Patent, is—

1. A location-tracer comprising a plurality of columns arranged under appropriate headings, giving respectively streets or points, car-lines, and connecting thoroughfares, with a key, substantially as set forth.

2. A location-tracer comprising a plurality of columns arranged under appropriate headings, giving respectively streets or points, car-lines, connecting thoroughfares, and distances from a given center, with a key, substantially as set forth.

3. In a location-tracer, a key; columns of streets or points, car-lines, and connecting thoroughfares respectively arranged consecutively, substantially as set forth.

In testimony whereof I have signed this specification in the presence of two subscribing witnesses.

HENRY S. BACON.

Witnesses:
F. A. CUTTER,
A. N. POND.